United States Patent [19]

Rakoski

[11] Patent Number: 6,088,022
[45] Date of Patent: Jul. 11, 2000

[54] SPHERICAL KEYBOARD WITH BUILT-IN MOUSE

[76] Inventor: Robert Charles Rakoski, 20 Grand Canyon Dr., Hendersonville, N.C. 28792

[21] Appl. No.: 09/019,818

[22] Filed: Feb. 6, 1998

[51] Int. Cl.[7] ............................... G09G 5/00; G09G 5/08
[52] U.S. Cl. ......................... 345/168; 345/156; 345/157; 345/163
[58] Field of Search .................................... 345/156, 157, 345/168, 163, 164, 166, 167; 400/489; 340/825; 361/680; D14/115; 84/719

[56] References Cited

U.S. PATENT DOCUMENTS

| | | |
|---|---|---|
| 3,945,482 | 3/1976 | Einbinder . |
| 4,917,516 | 4/1990 | Retter ...................................... 400/485 |
| 5,063,376 | 11/1991 | Chang ..................................... 340/825 |
| 5,160,919 | 11/1992 | Mohler et al. . |
| 5,243,430 | 9/1993 | Emmons ................................ 340/825 |
| 5,260,512 | 11/1993 | Chomette et al. ......................... 84/719 |
| 5,270,709 | 12/1993 | Niklsbacher . |
| 5,287,089 | 2/1994 | Parsons . |
| 5,339,097 | 8/1994 | Grant . |
| 5,351,066 | 9/1994 | Rucker et al. . |
| 5,416,498 | 5/1995 | Grant . |
| 5,426,449 | 6/1995 | Danziger . |
| 5,457,448 | 10/1995 | Totsuka et al. .......................... 340/825 |
| 5,491,497 | 2/1996 | Suzuki . |
| 5,528,523 | 6/1996 | Yoshida . |
| 5,583,541 | 12/1996 | Solhjell . |
| 5,612,691 | 3/1997 | Murmann et al. . |
| 5,661,505 | 8/1997 | Livits . |

Primary Examiner—Vijay Shankar

[57] ABSTRACT

An ergonomic keyboard includes a spherical body that is molded with cavities in its outer surface for receiving depressible function keys. The cavities are arranged in arcuate rows, with the rows corresponding to the positions and varied lengths of the fingers on a human hand. Keys are arranged in the cavities in a standard keyboard format such that users with conventional typing skills can use normal fingering for data entry without lifting their hands from the spherical body. Specifically, letter and function keys typically positioned on the left two-thirds of conventional keyboards are arranged in forwardly converging side cavities in a standard QWERTY format, with additional function and specialty keys positioned thereunder. Numeric and mathematical function keys are provided in cavities positioned on the back side of the spherical body which generally faces away from the user. Mouse "clicker" keys are positioned in a front side of the spherical body between the converging letter keys. The spherical body rests in a circular base equipped with a roller ball-type mouse mechanism in its bottom and a connector cable. To allow for adjustment of angle and position of the keys relative to a user's height or position, the spherical body is adjustably connected to the base by means of a dovetail joint provided along the bottom surface of the spherical body and a dovetailed slot provided in a top of the base. During data entry, users' fingers and hands rest in anatomically neutral positions along the surface of the spherical body, with the on-screen pointer being moved by gliding the spherical body/base combination over the work surface while keeping both hands on the spherical body. As no separate mouse, mouse pad or wrist rest is required, the device can be safely and comfortably used at remote locations and in limited work space environments.

4 Claims, 5 Drawing Sheets

SPHERICAL KEYBOARD WITH BUILT-IN MOUSE

FIELD OF THE INVENTION

The present invention relates to data entry devices for electronic instruments and more particularly to an ergonomically designed, space efficient keyboard that is compatible for use with computers, electronic typewriters and the like.

BACKGROUND OF THE INVENTION

Conventional keyboards for computer systems are detachable units having generally horizontal, rectangular configurations. In addition to the QWERTY key layout, a typical keyboard includes a numeric keypad, dedicated and programmable function keys, and cursor control keys. An on-screen pointer control means, such as a remote mouse or a button or touch pad integrated with the keyboard, is also provided. Various accessories, including mouse pads and wrist rests, are typically positioned on the work surface proximate the keyboard.

It is well documented that the unnatural, palms-down typing position dictated by conventional keyboards results in user injuries. Prolonged use of conventional keyboards causes fatigue of the muscles, nerves and tendons of the forearms, wrists and hands, resulting in varying degrees of pain and numbness. Such injuries, if untreated, lead to Carpal Tunnel Syndrome and, for the employers of the injured employees, increased insurance premiums.

There is a documented relationship between keyboard-related injuries and traditional typing positions. First, users of conventional keyboards hold their wrists in a state of dorsal flection for prolonged periods of time without relief. (Dorsal flection of the wrist is the movement required when one's arm is extended forward and hand raised, palm outward, to signal "stop.") Such unnatural positioning of the wrist causes fatigue to the muscles, tendons and nerves. Second, keyboard users typically rest their wrists or the base of their hands on the hard desk surface or against a sharp corner of the desk while typing. Such positioning cuts off blood flow through the wrists to the hands and disrupts neurotransmission. Third, conventional keyboards require users to hold their wrists in a state of lateral planar extension for extended periods of time. That is, a user's hands, when properly positioned, are close together, bent at the wrists at approximately thirty degrees from the natural straight resting position, and splayed outward, pointing away from the user's body. Such unnatural positioning results in pain, numbness and fatigue to the hands, wrists and forearms.

While numerous mechanisms have been developed to compensate for the unnatural hand and wrist positioning mandated by existing keyboards, none have proven completely effective. For example, wrist rests lessen the degree of dorsal flection and cushion the wrists, but fail to address the problem of lateral planar extension. "Wave" keyboards, i.e., keyboards having a wrist bridge incorporated therein with the keys arranged in v-shaped patterns rather than in straight lines, lessen the degree of dorsal flection and substantially eliminate lateral planar extension, but restrict normal blood flow and neurotransmission, as users' wrists are constantly pressed against the hard wrist bridge. Needs exist for keyboards that provide for hand and wrist positioning during data entry that does not restrict blood flow or lead to fatigue, pain and numbness in the forearms, wrists and hands.

Users of conventional keyboards assume generally upright postures when typing. Sitting upright for extended periods of time eventually causes fatigue to the spine and muscles and nerves of the lower back. To relieve that fatigue, users often slouch in their chairs, resulting in further stress to the back and neck. While innovative kneeling posture chairs or stools correct for the problem of back fatigue in some, but not all, cases, such chairs create additional stress on users' knees. Needs exist for keyboards that eliminate extended periods of stress on any single area of the human body by allowing users to frequently change posture without interrupting data entry.

A conventional keyboard measures about six inches by eighteen inches and occupies at least 118 square inches of desktop space. Additional desktop space must be allocated for a monitor, a mouse pad and a wrist rest. In all, it is customary for users to dedicate over three hundred square inches of desktop space to computer equipment. As many workstations offer limited work surfaces, users are forced to arrange the components in awkward and inconvenient positions, causing an increase in user discomfort and a decrease in productivity. Needs exist for keyboards that leave a small footprint on a desktop surface and that eliminate the need for additional space-consuming peripherals.

With conventional keyboards, operation of the mouse requires users to remove at least one hand from the keyboard. Once the mouse function is completed, users must then return their hands to the keyboard and reposition their fingers. That series of motions wastes time, creates mental confusion and leads to input errors, as the fingers are often repositioned on incorrect keys. Further, keyboard-integrated mouse mechanisms, such as touch pads, GLIDE POINTS® buttons and track balls, are difficult to control and are prone to accidental movement. Needs exist for keyboards that provide for the easy and efficient implementation of mouse functions without requiring users to remove their hands from typing positions along the surface of the keyboard.

Previous attempts to overcome the limitations of conventional keyboards have proven unsuccessful. For example, U.S. Pat. No. 5,426,449 discloses an ergonomic keyboard comprised of three angled sets of keys positioned to form a pyramid-shaped keyboard. Adjustable hand rests extend outward from the keyboard between the sets of keys for maintaining the hands and wrists of the user in relaxed arc positions. A track ball/mouse is provided on the front keypad, and the outwardly sloping and manually adjustable left and right keypads present the letter keys in the standard QWERTY format. While the device disclosed in U.S. Pat. No. 5,426,449 provides for the positioning of the user's hands in a more natural orientation, it does not relieve all strains in the wrists or prevent restriction of blood flow or neurotransmission through the hands or wrists, fails to readily accommodate changes in sitting posture, leaves a substantially large footprint on the desktop, and provides for difficult operation of the mouse, as users must either remove their hands from the keys or rely only on their thumbs for positioning the on-screen cursor.

U.S. Pat. Nos. 5,351,066 and 5,160,919 further disclose devices including input keys positioned for allowing users' hands to be placed in anatomically neutral positions. Those devices, however, fail to address many of the shortcomings of conventional keyboards discussed above.

It would be desirable therefore to provide a data input apparatus that maintains the hands in relaxed positions during data entry, automatically compensates for changes in sitting posture, occupies minimal desktop space, and is convenient and easy to use.

SUMMARY OF THE INVENTION

The present invention is directed to a compact, user-friendly, ergonomic computer data entry device having built-in mouse functions. By including all alphanumeric and function keys and on-screen pointer control means in a compact unit, the present device renders obsolete spacific-consuming horizontal keyboards and negates the need for peripheral pointer controls, i.e., a mouse, wrist rests and related computer accessories.

The ergonomic keyboard includes a spherical body that is rotatably connected to a circular base. The body and the base, which are separate units preferably injection molded from plastic, are joined together by a male arcuate dovetail positioned on the underside of the body and a female arcuate dovetail provided in the top of the base. The arcuate dovetail joint allows the body to rotate in a limited range of motion 35 degrees toward or 55 degrees away from the user. Molded plastic tabs positioned at ends of the male arcuate dovetail limit the range of motion of the body toward and away from the user and prevent the body from becoming detached from the base during use.

The spherical body of the ergonomic keyboard has molded cavities provided in its outer surface for receiving individually molded function keys. The cavities are grouped in sets, including a right set, a left set and a back set. The cavities of the right and left sets are arranged in arcuate rows, with the rows converging toward and meeting at a front of the spherical body in a generally v-shaped pattern. The back set of cavities is provided in the surface of the spherical ball opposite the front thereof, with the rows of cavities constituting the back set being arranged in a generally rectangular array. The arcuate rows forming each set, and the cavities included in those rows, are positioned and spaced so as to accommodate the varied lengths of the fingers of a human hand.

For ease of use and to facilitate user acceptance, the device maintains a traditional arrangement of keys. For example, conventional keyboards for personal computers arrange all keys (excluding the numeric keypad, the cursor control keys and special dedicated function keys, i.e., delete, insert) in six rows, with the alphabetic keys arranged in a QWERTY format. In QWERTY format embodiments of the present invention, the left and right cavity sets include six rows of cavities, with the horizontal rows of keys from a conventional keyboard being lifted as a unit, curved into an arc, and placed in the cavities. While the keys are arranged in arcs, rather than in straight, horizontal rows, the traditional arrangement of the keys in relation to one another is maintained. The keys forming the numeric keypad typically located at the far right of a conventional keyboard are inserted in the cavities forming the back set, once again arranged in arcs but maintaining their relative positions. Additional keys, such as cursor control keys and dedicated function keys, are placed in additional arcuate rows of cavities positioned beneath the right and left sets so as not to disturb normal fingering for data entry. It should be understood that the present invention may include keys arranged in any keyboard format.

The base of the present keyboard includes a housing that is equipped with a urethane roller ball-type mouse mechanism. Specifically, the roller ball of the mouse mechanism extend beyond the bottom of the housing, with the on-screen pointer being controlled by gliding the base along the desktop surface, thereby causing the roller ball to rotate. Selection, or"clicker", keys are provided on the spherical body in easy range of index finger motion for locking the pointer at a desired position. A connector cable is hard wired to the base on the side opposite the user and includes means on its free end for connecting the cable to a conventional pin port of a computer central processing unit.

A significant advantage of the spherical keyboard is that it may be used for extended periods of time without causing fatigue to the muscles, arms and tendons of users' forearms, wrists or hands. When oriented in a"typing" position along the surface of the spherical body, the hands adopt the following natural position: thumbs pointing up, fingers gently arched, with the fingertips of opposing hands pointing towards one another, and palms nearly vertical, turned only slightly downward. The hands remain elevated by the strong structure of the elbows held against the sides of the torso, not by the weaker, unsupported structure of the wrists. In that position, the hands are completely at rest, with the wrists maintaining a relaxed posture with a slight ventral bend. No dorsal flection is required when using the keyboard, as the slight ventral bend of the relaxed hand and wrist and the slightly arched position of the fingers conform to the shape of the spherical body naturally, without any muscle flection or tendon strain. Restriction of blood flow or neurotransmission is not an issue, as the arms, wrists and hands of users never touch the desktop or other hard work surface. Further, movement of the hands around the spherical body during typing does not involve extreme lateral planar extension of the wrist, but rather only requires gentle rotation of the entire forearm from the elbow. As such, the present keyboard eliminates the operational circumstances generally known to lead to various keyboard-related injuries.

When using the present keyboard, users' forearms, wrists and hands are in constant motion, without strain to any single muscle or tendon and without restriction of normal blood flow or neurotransmission. The continuous, gentle hand and wrist motion realized when using the new keyboard is the key to eliminating the main cause of wrist fatigue, namely, the holding, of the wrist in any single position for extended periods of time without relief. In fact, the slight, gentle rotation of users' wrists in all directions that occurs as users' hands glide over the spherical body approximates the gentle range of motion exercises prescribed by physical therapists to relieve pain and numbness associated with wrist fatigue.

The present keyboard allows users to frequently change work posture without interruption. The arcuate dovetailed joint connecting the body to the base allows the spherical body to rotate toward or away from users, thereby automatically compensating for changes in users' postures. For example, when a user changes from an upright seated position to a slightly reclining posture, the user's hands, which remain on the spherical body, are pulled back, thereby rotating the spherical body towards the user. When the user rises to a standing position, the user's hands move forward, thereby rotating the spherical body away from the user. The user's hands remain in their proper fingering positions for data entry at all times, with the user never having to interrupt the data entry process to make keyboard adjustments.

Another important advantage of the new keyboard is that users can easily position the on-screen pointer and cursor without removing a single finger from its key-striking position along the surface of the spherical body. To change the position of the pointer or cursor, users simply glide the keyboard along the surface of the desktop, with both hands remaining on the spherical body for added control. When the on-screen pointer is adjusted to its desired position, users click the selection buttons provided on the spherical body using the appropriate finger and can immediately resume typing, without having to reposition any fingers. User efficiency is thereby increased and typographical errors which typically occur as a result of incorrect finger repositioning are substantially reduced.

An additional advantage realized by the new keyboard is economy of size. In typical embodiments of the present keyboard, the base occupies less than 18 square inches, and no mouse, wrist rests or other accessories are required. A bi-level computer desk is also not needed for safe and comfortable operation, as the rotational attachment of the spherical body to the base allows for adjustment of angle and position of the keys relative to a user's height with reference to any work surface.

With the foregoing and other advantages and features of the invention that will become hereinafter apparent, the nature of the invention may be more clearly understood by reference to the following detailed description of the invention, the appended claims and to the several views illustrated in the drawings.

DETAILED DESCRIPTION OF THE INVENTION

Figure 1:
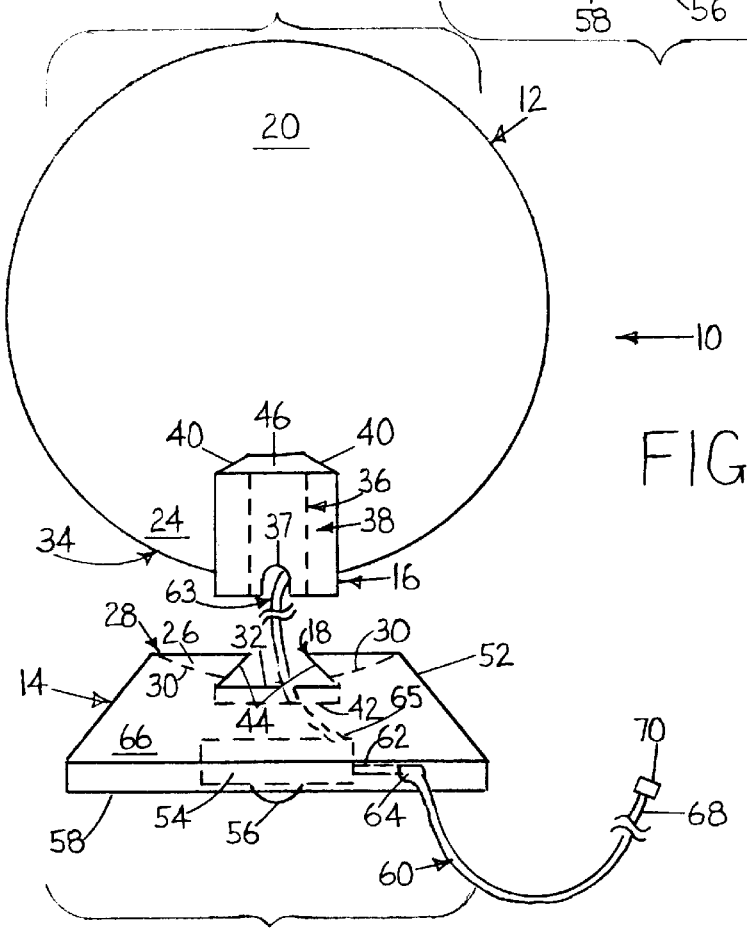
FIG. 1 is a rear view of the keyboard in a disassembled state showing the base, the spherical body and the dovetailed connecting means.

Referring now to the drawings wherein like parts are designated by like reference numerals throughout, there is illustrated in FIG. 1 a keyboard of the present invention which is designated generally by reference numeral 10. Keyboard 10 includes a generally spherical body 12 and a base 14. The spherical body 12 carries the data input keys and the base 14 incorporates the on-screen pointer control, or mouse, mechanism. The body 12 and the base 14 are separate components, each preferably made primarily of plastic, that are connectable by means of mating elements 16, 18 provided thereon or integral therewith. The connecting means 16, 18 provide for limited rotation of the spherical body 12 relative to the base 14.

The spherical body 12 has a back 20, a front 22 (FIG. 2) and an undersurface 24. Mating element 16, in this case a raised projection, extends along the undersurface 24 of the spherical body 12 between the front 22 and the back thereof and follows the curvature of the great circle of the spherical body 12. The base 14 has a dish-shaped recess 26 in its upper surface 28 with mating means 18, in this case a central, arcuate, open-ended slot, defined therein for receiving the raised projection 16. The recess 26 is defined by sloped walls 30 extending between upper edges 32 of the slot 18 and the upper surface 28 of the base 14, with the sloped walls 30 following the radius of curvature of the spherical body 12. When assembled, the spherical body 12 is nestled in the base 14, with the raised projection 16 extending through the slot 18 and the outer surface 34 of the spherical body 12 proximate the projection 16 overlying the sloped walls 30 defining the recess 26.

As shown in FIG. 1, the body 12 is preferably connected to the base 14 by means of a dovetail joint. The projection 16 provided along the undersurface 24 of the body 12 has a narrow, arcuate upper surface 36 that is connected to or integral with the outer surface 34 of the body 12, a wide, arcuate lower surface 38 that follows the curvature of the body 12, and sides 40 sloping downward and outward from the upper surface 36 to the lower surface 38. The arcuate slot 18 provided in the base 14 has dimensions for securely receiving the dovetailed projection 16 therein. Specifically, the bottom of the slot 18 is defined by an arcuate surface 42 following the curvature of the lower surface 38 of the projection 16, with the sides of the slot 18 defined by upwardly and inwardly sloping walls 44 that follow the height and slope of the sides 40 of the projection 16.

Figure 2:
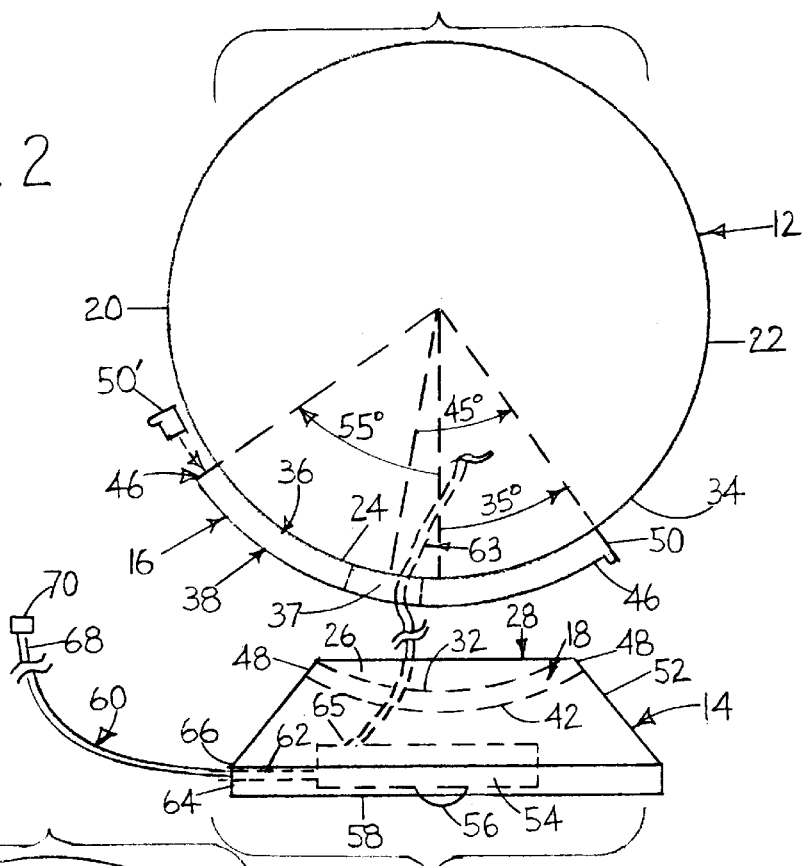
FIG. 2 is a side view of the keyboard of FIG. 1.

To connect the body 12 to the base 14, the projection 16 is inserted into the open-ended slot 18 through one end thereof. As shown in FIG. 2, the length of the projection 16 is greater than that of the slot 18, thereby allowing ends 46 of the projection 16 to extend beyond the ends 48 of the slot 18 when fully inserted. The projection 16 freely slides forward or backward through the slot 18, rendering the angle of the spherical body 12 infinitely adjustable. Tabs 50, 50' are provided at ends 46 of the projection 16 to prevent the projection 16 from inadvertently leaving the slot 18. Specifically, tabs 50, 50' increase the width of the ends 46 of the projection 18, thereby preventing the ends 46 from entering the slot 18 and limiting the range through which the body 12 may be rotated relative to the base 14. To allow for disassembly of the keyboard 10, at least one of the tabs 50' is removably connected to the end 46 of the projection 16.

As shown in FIG. 2, the raised projection 16 preferably spans about one quarter of the circumference of the great circle of the spherical body 12 and extends further rearward than forward along the outer surface of the spherical body 12. In a preferred embodiment, the projection 16 has dimensions for permitting the spherical body 12 to rotate a maximum of 55 degrees rearward and 35 degrees forward of an imaginary plane vertical through the body and perpendicular to any user surface.

It should be understood that other means for adjustably connecting the body 12 to the base 14 may be incorporated without departing from the scope of the present invention. It should also be readily apparent to those skilled in the art to modify the embodiment disclosed in FIGS. 1 and 2 so as to reverse the positioning of the male and female connecting members, namely, by positioning the raised projection on the base and having the slot provided in the undersurface of the spherical body.

The base 14 includes a housing 52 having a urethane roller ball-type mouse mechanism 54 mounted therein. The spherical body mating means 18, such as the arcuate slot, is provided along an upper surface 28 of the housing 52. The mouse mechanism 54 is similar to conventional on-screen pointer controls and includes a roller ball 56 which extends beyond the bottom 58 of the housing 52. When the housing 52 is moved along a mat or desktop surface, the ball 56 rotates. As the ball 56 moves, electrical pulses are generated which inform the computer of the ball's exact change in position. The computer responds by moving the on-screen pointer in the same direction as the ball 56. When the pointer is positioned over an on-screen icon, a switch, or clicker key 58 (FIGS. 3 and 5), provided on the spherical body 12 may be pressed for directing the computer to perform the desired function. Thus, the on-screen pointer is easily positioned without the user's hands ever leaving the spherical body 12. In fact, increased pointer control is provided as two hands are used to move the base 14, and hence the pointer, to the desired position.

Electrical pulses indicative of the changing position of the roller ball 56 are delivered to the computer via a connector cable 60. The connector cable 60 includes a first end 62 extending through an opening 64 provided in a back side 66 of the housing 52 and electrically connected, or hard wired, to the mouse mechanism 54. The second, free end 68 of the cable 60 has a plug 70 affixed thereto for connecting the cable 60 to a conventional pin port provided on a central processing unit (not shown).

Figure 3:
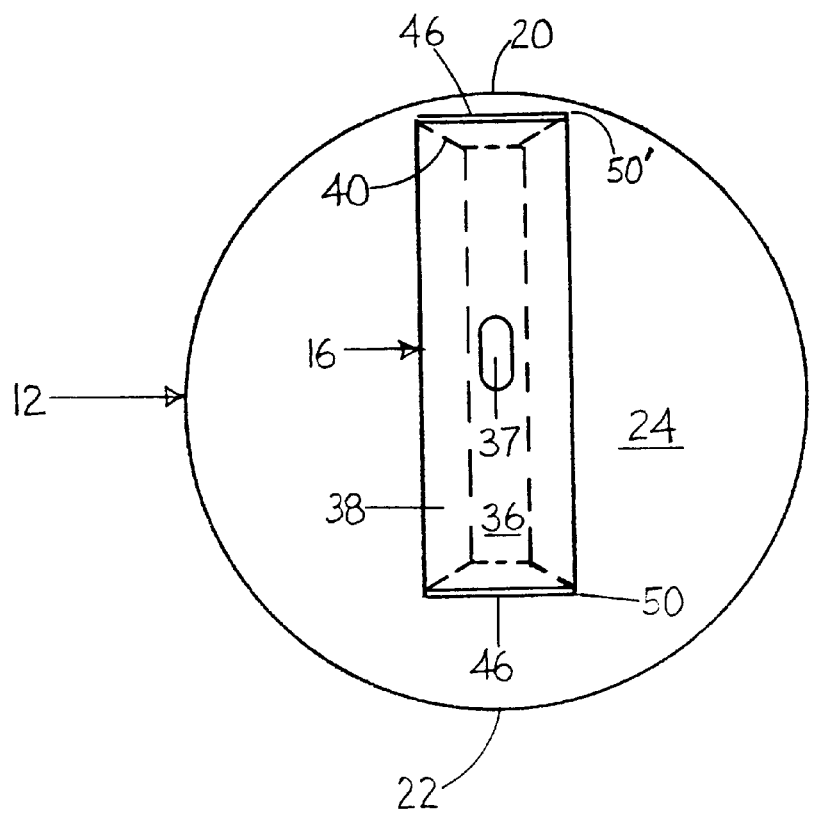
FIG. 3 is a bottom view of the spherical body of the keyboard.

Referring to FIGS. 1–3, a keyboard coaxial cable 63 is connected to the input means (FIGS. 5–7) provided along the spherical body 12 and extends outward from the spherical body 12 through a small, elongated cavity 37 provided in an underside thereof. Cavity 37 is centrally located at the midpoint of the lower surface 38 of the arcuate dovetail projection 16, equidistant from the front and back ends 46 of the projection 16. That is, when the dovetail projection 16 spans one-quarter of the circumference of the spherical body 12, i.e., 90 degrees, the center of cavity 37 is located 45 degrees from either end 46 thereof. In a preferred embodiment, cavity 37 spans ⅔ of the length of the projection, i.e., when the dovetail projection 16 spans ninety degrees, the cavity 37 spans 20 degrees. As shown in FIGS. 1 and 2, cable 63 enters the base 14 and connects to the mouse mechanism 54 at junction 65.

Figure 4:
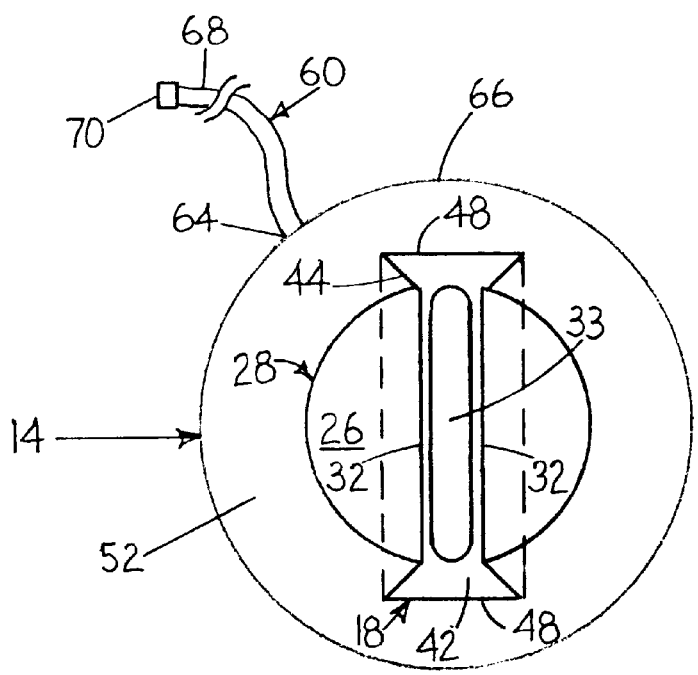
FIG. 4 is a top view of the circular base of the keyboard.

Referring to FIG. 4, an elongated pass-through cavity 33 is located in the arcuate surface 42 forming the bottom of the dovetailed slot 18 in base 14. The length of elongated cavity 33 is equivalent to the diameter of the circle defined by the upper surface 28 of the base 14. When projection 16 of spherical body 12 slides into slot 18, cable 63 passes from spherical body 12 to base 14 through elongated cavities 33, 37. The free end of cable 63 is then hardwired to mouse mechanism 54 along with cable 60.

Figure 5:
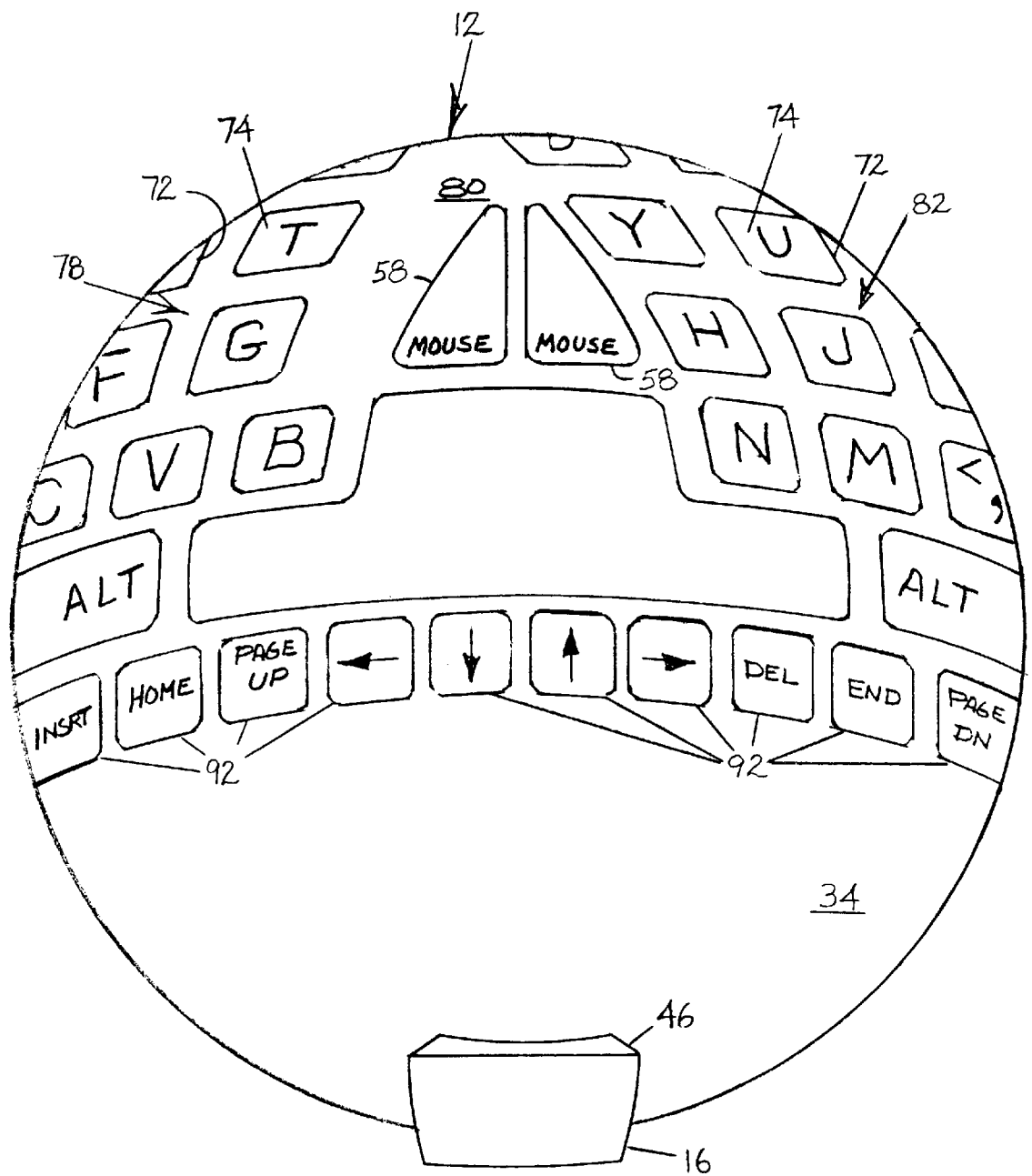
FIG. 5 is a front view of the spherical body of the keyboard.
Figure 6:
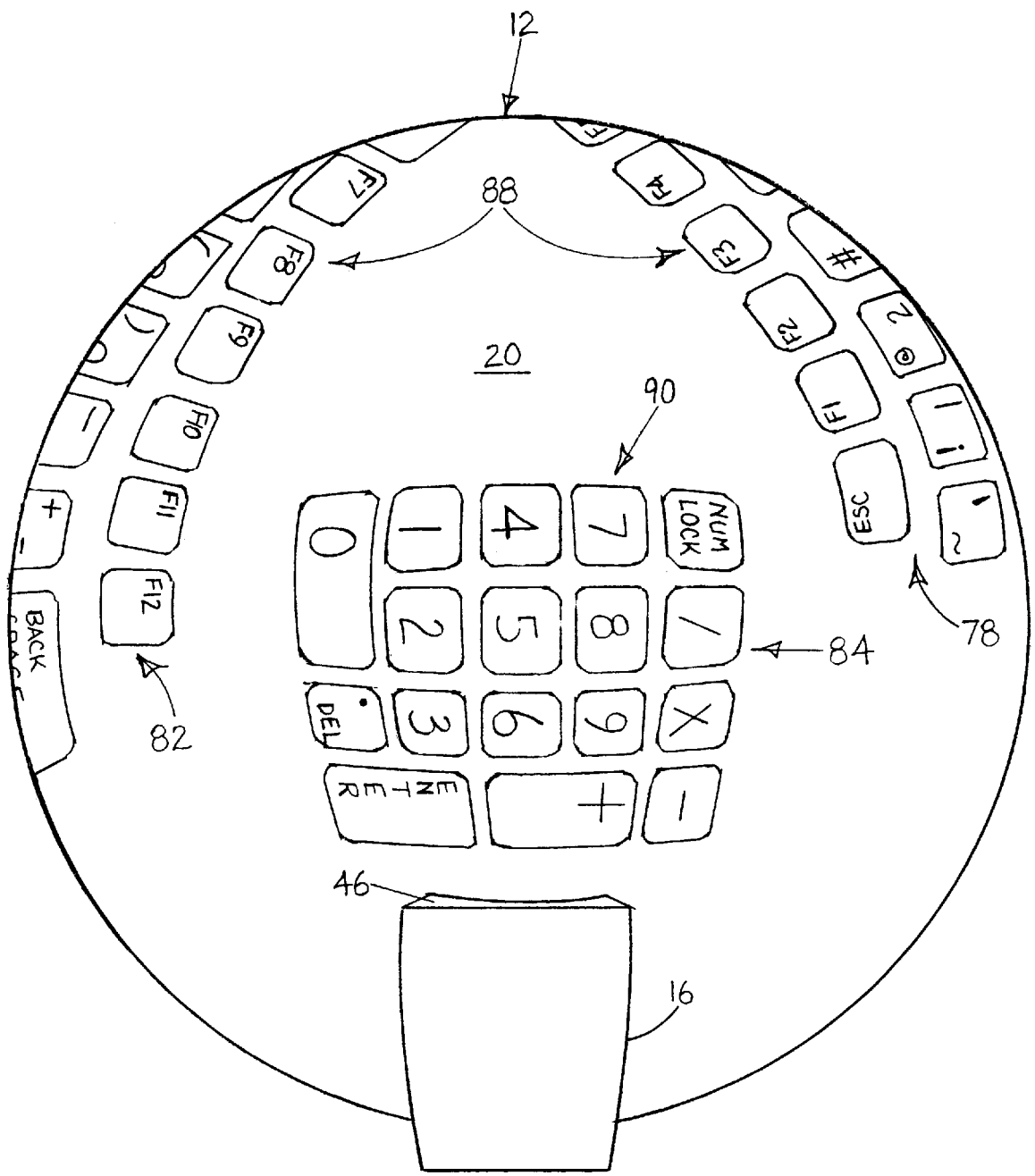
FIG. 6 is a rear view of the spherical body of the keyboard.
Figure 7:
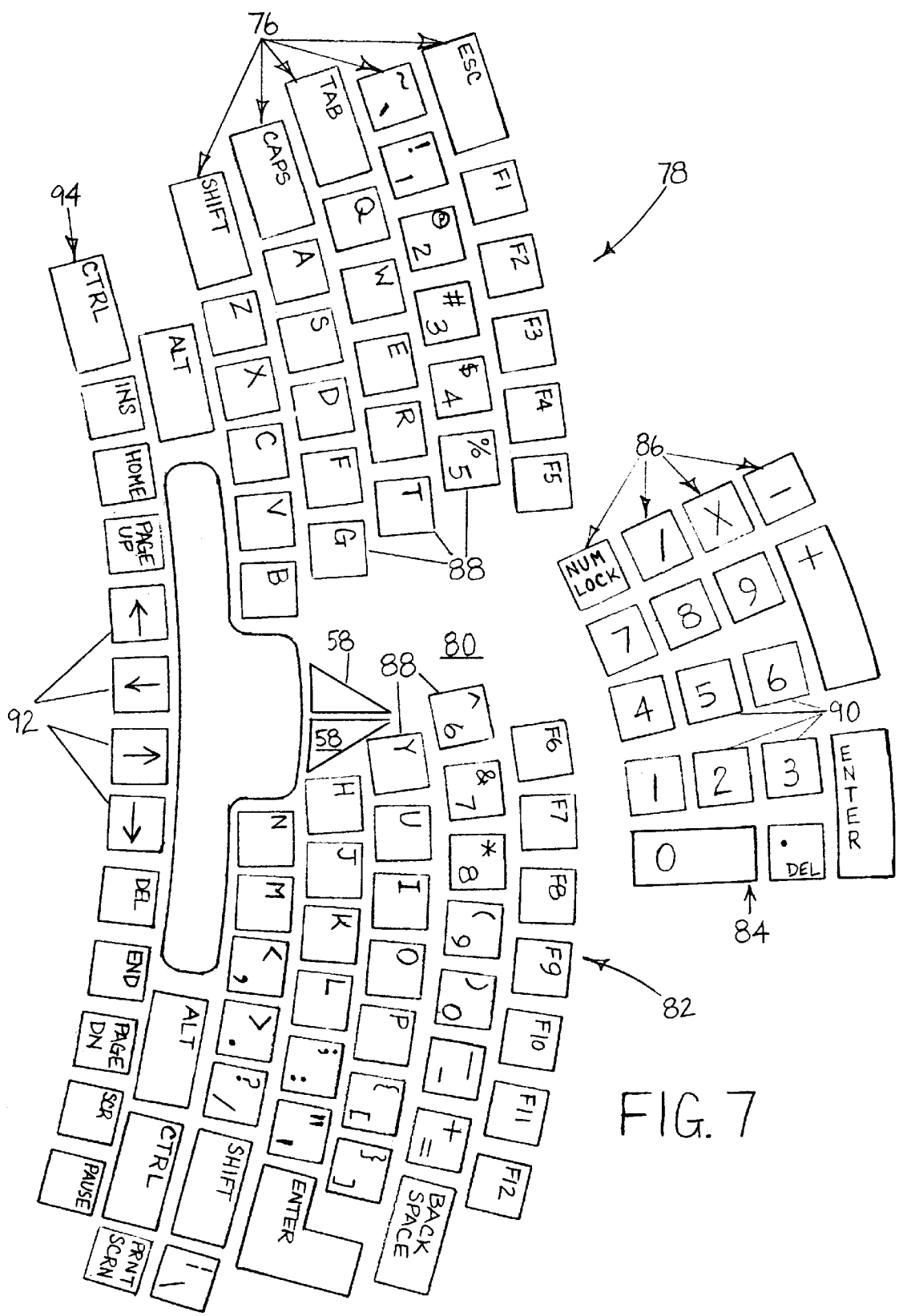
FIG. 7 shows the key arrangement for the spherical body on a plane surface.

Referring to FIGS. 5–7, the generally spherical body 12 has cavities 72 provided in its outer surface 34 for receiving individually molded function keys 74. The cavities 72, and hence the keys 74, are generally arranged in arcuate rows and may be grouped in three sets: a first key set 78 occupying the left side of the spherical body 12 and converging toward the upper front center 80 of the body 12; a second key set 82 occupying the right side of the spherical body 12 and converging toward the upper front center 80 of the body 12; and a third key set 84 positioned in a back side of the body 12 directly above the rearward end 46 of the raised projection 16. The first and second key sets 78, 82 are arranged in arcuate rows 76, with the rows 76 converging towards and meeting at the front 22 of the spherical body 12 in a generally v-shaped pattern. The third key set 84, which is not visually accessible to the user, includes arcuate rows 86 arranged in a generally rectangular array. The positioning and spacing of the arcuate rows 76, 86, as well as the cavities 72 forming those rows, are selected so as to accommodate the varied lengths of the fingers of a human hand and to allow all keys of at least the first and second key sets 78, 82 to be reached and operated by at least one finger of the user's hands without changing hand position.

To facilitate user acceptance, the arrangement and number of cavities 72 provided in each set 78, 82, 84 is selected such that a traditional arrangement of keys is maintained. For example, FIGS. 5–7 disclose an embodiment of the present keyboard having a standard QWERTY format. In that QWERTY format embodiment, the right and left key sets 78, 82 each include six arcuate rows, with those rows housing the primary keys 88, i.e., keys located in the six horizontal rows provided on the left two-thirds of a conventional keyboard. While the keys are arranged in arcs, rather than in straight, horizontal rows, the traditional arrangement of the keys in relation to one another is maintained. The numeric and mathematical function keys 90 included the numeric keypad typically located at the far right of a conventional keyboard are inserted in the cavities 72 constituting the third key set 84, once again arranged in arcuate rows but maintaining their relative positions. Additional keys 92, such as cursor control keys and dedicated function keys that are typically located on conventional keyboards between the six rows of primary keys and the numeric keypad, are provided in additional arcuate rows 94 positioned beneath the right and left sets 78, 82 of primary keys 88 so as to be accessible by the thumbs and pinky fingers without disturbing normal fingering for data entry. It should be understood that the present invention may be used with other keyboard formats. What is important, however, is that a majority, if not all, of the keys, and particularly those that are most often selected, be readily accessible by at least one of the user's fingers when the user's hands are properly positioned around the spherical body.

Referring to FIG. 5, the spherical body 12 further includes cavities positioned in its upper front surface 80 for housing switches, or clicker keys 58, for controlling mouse functions. Clicker keys 58 are preferably positioned to be in easy range of index finger motion. It should be, readily apparent that the clicker keys 58 may be moved to other locations along the body 12 or base 14 without departing from the scope of the present invention.

The present keyboard 10 is operated as follows. With the spherical body 12 rotatably connected to the base 14, a user's hands are positioned around the spherical body 12 in their natural, relaxed positions. Specifically, the user's hands are oriented such that the palms are nearly vertical, turned only slightly downward, the thumbs are pointing upward, and the fingers are gently arched with fingertips of opposing hands pointing toward one another and gently tapping on the outer surface of the spherical body. The hands are then shifted such that all keys 74 of the right and left key sets 78, 82 are readily accessible by at least one finger. The user's sitting posture may be adjusted without affecting finger positioning, as the spherical body rotates forward and rearward with the forward or rearward movement of the user's arms and hands. Typing may then begin. To adjust the position of the on-screen pointer, the user, whose hands are already on the spherical body 12 in typing position, simply moves the spherical body 12 and base 14 as a unit in a desired direction. That movement does not require the user to lift a finger from the spherical body 12 or to change fingering position in any respect.

While the invention has been described with reference to a spherical body, it should be understood that the body may take other regular and irregular curved shapes that provide for the natural hand positioning described above. Further, the cavities 72 may be eliminated from the surface 34 of the spherical body 12 if the data input keys are touch pads or the like.

From the foregoing, it will be appreciated by those skilled in the art that the present invention provides a particularly effective and advantageous apparatus for solving several problems associated with existing keyboards.

Although certain presently preferred embodiments of the present invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. An ergonomic keyboard apparatus, comprising:

a base having a bottom;

a pointer-control mechanism mounted in said base, said control mechanism comprising a roller ball extending beyond said bottom of said base; and a generally spherical body having a curved outer surface and input keys provided along said outer surface, said keys further comprising alphabetic keys arranged in a standard keyboard format along said curved outer surface, and said body being rotatably connected to said base.

2. The apparatus of claim 1, wherein said bottom of said base is generally circular.

3. The apparatus of claim 2, wherein said base has a height of about 1.625 inches, wherein said bottom of said base has a diameter of about 4.75 inches, and wherein said spherical body has a diameter of about six inches.

4. The apparatus of claim 1, further comprising a connector cable having a first end connected to said control mechanism, and a second end opposite said first end having means for connecting said cable to a pin port of a central processing unit, and a keyboard cable having a first end connected to said keys of said spherical body and a second end connected to said control mechanism.

* * * * *